Patented July 8, 1941

2,248,151

UNITED STATES PATENT OFFICE 2,248,151

PRODUCTION OF SUBSTANTIVE AZO DYESTUFFS

Hermann Winkeler, Schkopau, and Albert Petz, Mannheim, Germany, assignors to General Aniline & Film Corporation, a corporation of Delaware No Drawing. Application July 11, 1939, Serial No. 283,828. In Germany July 23, 1938

1 Claim. (Cl. 260—143)

The present invention relates to substantive azo dyestuffs.

We have found that substantive azo dyestuffs of the following formula have especially good tinctorial properties:

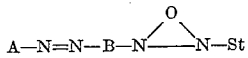

in which A is the radicle of an aromatic ortho-hydroxy-carboxylic acid containing at least one sulphonic acid group, B is an aromatic or aromatic-heterocyclic radicle and St is the radicle of a nitrostilbene disulphonic acid.

For the preparation of the dyestuffs, the initial material may be for example a sulphonic acid of an amino-hydroxybenzene- or -naphthalene-ortho-carboxylic acid or also an aminobenzoyl or aminobenzenesulphonyl compound of the said aminohydroxy-ortho-carboxylic-sulphonic acids. The said compounds are diazotized and coupled for example with aromatic or heterocyclic compounds containing amino groups. As such there may be mentioned especially those coupling in para-position to an amino group, as for example 1-amino-3-methylbenzene, 1-amino-2-methoxy-5-methylbenzene, 1-amino-2.5 - dimethylbenzene, 1-amino-2.5 - dimethoxybenzene, 1 - aminonaphthalene and its 6- and 7-sulphonic acids, or also aromatic-heterocyclic coupling components, such as 1-(3'- or 4'-aminophenyl) -3-methyl-5-pyrazolone and the carboxylic acids, esters and amides derived therefrom. The aminoazo dyestuffs thus obtainable are then reacted in alkaline solution with a dinitrostilbene disulphonic acid or a compound convertible into the same, such as 4-nitro-1-methylbenzene-2-sulphonic acid. It is often of advantage to treat the finished dyestuffs with reducing agents and, if desired, thereafter with oxidizing agents.

The aminoazo dyestuffs of the formula

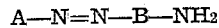

may also be prepared by coupling a diazotized nitro- and mono-acyldiaminobenzene with an aromatic ortho-hydroxycarboxylic acid containing sulphonic acid groups and being capable of coupling, the nitro groups then being reduced or the acylamino groups saponified.

The dyestuffs obtainable in the said manner go on to vegetable fibers very uniformly; the dyeings have excellent fastness to alkali and washing.

The following examples will further illustrate how this invention may be carried out in practice but the invention is not restricted to these examples.

Example 1

1 molecular proportion of 1-amino-3-carboxy-4-hydroxybenzene-5-sulphonic acid is dissolved in sodium carbonate solution and, after the addition of 1 molecular proportion of sodium nitrite, it is allowed to flow into a mixture of ice and hydrochloric acid. The diazo compound is then stirred for some hours and then coupled with a hydrochloric acid solution of 1-amino-2-methoxy-5-methylbenzene, the mixture being rendered acid with sodium acetate. The azo dyestuff formed is filtered off by suction, the filter cake taken up with water and dissolved by the addition of an excess of caustic soda solution. To the solution there is added 0.65 molecular proportion of p.p'-dinitrostilbene-o.o'-disulphonic acid and the whole is boiled for 3½ hours. The resulting dyestuff is salted out, filtered off by suction and dried. It dyes vegetable fibers and viscose artificial silk a red color. By aftertreatment with chromic salt solutions, dyeings very fast to washing are obtained.

By using 4'-aminobenzoyl-1-amino-3-carboxy-4-hydroxybenzene-5-sulphonic acid as diazo component, a brilliant substantive orange fast to light is obtained the dyeings of which have good fastness to washing, after treatment with chromic fluoride.

Example 2

1 molecular proportion of 4'-aminobenzoyl - 1 - amino-2-hydroxy-3-carboxybenzene-5 - sulphonic acid is dissolved in sodium carbonate solution, mixed with 1 molecular proportion of sodium nitrite and introduced into a mixture of ice and hydrochloric acid. The diazo compound is stirred for 2 hours and is then coupled with a soda-alkaline solution of 1 molecular proportion of 1-(4'-aminophenyl) -3-methyl-5-pyrazolone to form the monoazo dyestuff, sodium acetate being added until there is an acetic acid reaction and the whole being stirred for a long time after coupling.

The azo dyestuff formed is filtered off by suction and then dissolved in 5 liters of 5 per cent caustic soda solution. To this solution there is then added 1 molecular proportion of p.p'-dinitrostilbene-o.o'-disulphonic acid and the whole boiled for 3 hours under reflux. The resulting dyestuff is salted out, filtered off by suction and dried. It dyes vegetable fibers red-orange shades which have a good fastness to light and, after treatment with chromic salts, a good fastness to washing.

Example 3

1 molecular proportion of 1-amino-3-carboxy-4-hydroxybenzene-5-sulphonic acid is dissolved in dilute caustic soda solution, 1 molecular proportion of sodium nitrite is added thereto and then allowed to run into hydrochloric acid while stirring. To the diazo compound there is then added a solution of 1 molecular proportion of 1-amino-2.5-dimethylbenzene prepared with dilute hydrochloric acid, and coupling to the azo dyestuff is effected with slow addition of sodium acetate. After stirring for several hours, the whole is weakly acidified with hydrochloric acid and pressed off. The dyestuff is then boiled in caustic alkali solution for 3½ hours under reflux with 0.7 molecular proportion of p.p'-dinitrostilbene-o.o'-disulphonic acid, the alkali neutralized with hydrochloric acid and the dyestuff salted out and pressed off.

The dyestuff gives on cotton and viscose artificial silk vivid orange dyeings of very good fastness to light, which acquire an excellent fastness to washing by aftertreatment with trivalent chromium salts.

What we claim is:

Azo dyestuffs of the general formula

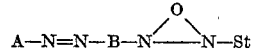

wherein A stands for the radicle of benzoyl-sulphoaminosalicylic acid, wherein B stands for a mononuclear radicle of the benzene series attached to the azo group in 1-position with reference to the azoxy group in 4-position, and wherein St stands for the radicle of a nitrostilbene-disulphonic acid.

HERMANN WINKELER.
ALBERT PETZ.